US010047762B2

(12) United States Patent
Liang et al.

(10) Patent No.: US 10,047,762 B2
(45) Date of Patent: Aug. 14, 2018

(54) IMPELLER AND MOLD FOR MANUFACTURING IMPELLER

(71) Applicant: SUNON ELECTRONICS (FOSHAN) CO., LTD., Guangdong (CN)

(72) Inventors: Sheng Chieh Liang, Kaohsiung (TW); Chih Chiang Lin, Kaohsiung (TW)

(73) Assignee: SUNON ELECTRONICS (FOSHAN) CO., LTD., Guangdong (CN)

( * ) Notice: Subject to any disclaimer, the term of this patent is extended or adjusted under 35 U.S.C. 154(b) by 748 days.

(21) Appl. No.: 14/557,314

(22) Filed: Dec. 1, 2014

(65) Prior Publication Data
US 2015/0204342 A1 Jul. 23, 2015

(30) Foreign Application Priority Data
Jan. 17, 2014 (TW) .............................. 103101860 A

(51) Int. Cl.
*F04D 29/32* (2006.01)
*F04D 29/18* (2006.01)
(Continued)

(52) U.S. Cl.
CPC .......... *F04D 29/181* (2013.01); *B29C 33/301* (2013.01); *B29C 33/485* (2013.01); *F04D 29/32* (2013.01); *B29L 2031/08* (2013.01)

(58) Field of Classification Search
CPC ............................... F04D 29/181; F04D 29/32
See application file for complete search history.

(56) References Cited

U.S. PATENT DOCUMENTS

| 4,502,837 A | * | 3/1985 | Blair | ....................... F01D 5/045 |
| | | | | 415/198.1 |
| 4,653,976 A | * | 3/1987 | Blair | ....................... F01D 5/045 |
| | | | | 415/1 |

(Continued)

FOREIGN PATENT DOCUMENTS

| JP | 11-210692 A | 8/1999 | |
| JP | 2002-113749 A | 4/2002 | |
| JP | WO 2013058284 A1 * | 4/2013 | ........... F04D 29/285 |

OTHER PUBLICATIONS

Office Action dated Apr. 26, 2016 by Taiwan Intellectual Property Office for the corresponding Taiwan Patent Application No. 103101860.
Search report dated Apr. 26, 2016 by Taiwan Intellectual Property Office for the corresponding Taiwan Patent Application No. 103101860.
English translation of the search report issued on Apr. 26, 2016 by Taiwan Intellectual Property Office for the corresponding Taiwan Patent.

(Continued)

*Primary Examiner* — Woody Lee, Jr.
(74) *Attorney, Agent, or Firm* — WPAT, P.C., Intellectual Property Attorneys; Anthony King

(57) ABSTRACT

The present disclosure provides an impeller and a mold for manufacting the impeller. The impeller includes a plurality of blades, and there is an overlapped area between two adjacent blades. The mold includes a first part, a second part and a plurality of slide groups. The first part and the second part move in a mold opening direction. At least a portion of each slide group is located in the overlapped area, and each slide group has a first slide block and a second slide block, and a movement direction of the first slide block and the second slide block is perpendicular to the mold opening direction. By using that the movement direction of the slide group is perpendicular to the mold opening direction, the impeller with blades that have the overlapped area may be manufactured. The blades of the impeller may have a special shape.

4 Claims, 11 Drawing Sheets

(51) Int. Cl.
*B29C 33/48* (2006.01)
*B29C 33/30* (2006.01)
*B29L 31/08* (2006.01)

(56) References Cited

U.S. PATENT DOCUMENTS

| | | | | |
|---|---|---|---|---|
| 5,611,668 | A * | 3/1997 | Yapp | F04D 29/023 |
| | | | | 416/189 |
| 6,126,395 | A | 10/2000 | Shingai | |
| 9,714,664 | B2 * | 7/2017 | Ishikawa | F04D 29/284 |
| 2004/0083609 | A1 * | 5/2004 | Malott | F04D 29/023 |
| | | | | 29/889.3 |
| 2006/0280609 | A1 * | 12/2006 | Ranz | B23P 15/006 |
| | | | | 416/182 |

OTHER PUBLICATIONS

JP 11-210692 A corresponds to U.S. Pat. No. 6,126,395.
English abstract of JP 2002-113749 A.
Office Action dated Aug. 2, 2016 by SIPO for the corresponding Chinese Patent Application No. 201410172780.8.
Search report dated Aug. 2, 2016 by SIPO for the corresponding Chinese Patent Application No. 201410172780.8.
English translation of the search report issued on Aug. 2, 2016 by SIPO for the corresponding Chinese Patent Application No. 201410172780.8.

* cited by examiner

IMPELLER AND MOLD FOR MANUFACTURING IMPELLER

BACKGROUND OF THE DISCLOSURE

1. Field of the Disclosure

The disclosure relates to an impeller and a mold for manufacting the impeller.

2. Description of the Related Art

In the conventional technology, an impeller is manufactured by using a mold, and for impellers of different shapes, molds of different shapes need to be designed. In addition, for an impeller with a special blade shape, in addition to that a matching shape needs to be designed for a mold, a mold removing direction of the mold also needs to be considered.

SUMMARY OF THE DISCLOSURE

The present disclosure provides a mold for manufacturing an impeller. In an embodiment, the impeller includes a plurality of blades, and there is an overlapped area between two adjacent blades. The mold includes a first part, a second part and a plurality of slide groups. The second part is corresponding to the first part, and the first part and the second part move in a mold opening direction. At least a portion of each slide group is located in the overlapped area, and each slide group has a first slide block and a second slide block. A movement direction of the first slide block and the second slide block is perpendicular to the mold opening direction.

The present disclosure provides an impeller. In an embodiment, the impeller includes a plurality of blades and a hub. There is an overlapped area between two adjacent blades. The blades are formed at the circumference of the hub. The hub has a surface, the surface has at least one parting line, At least a portion of the at least one parting line is located in the overlapped area.

By using that the movement direction of the slide group is perpendicular to the mold opening direction, the impeller with blades that have the overlapped area may be manufactured. The blades of the impeller may have a special shape; for example, a curved surface of the blade folds reversely or the blades have different curved surfaces and different curvatures. These impellers having blades with an overlapped area or blades of special shapes may be manufactured by using the mold of the present disclosure.

DETAILED DESCRIPTION OF THE DISCLOSURE

Figure 1:
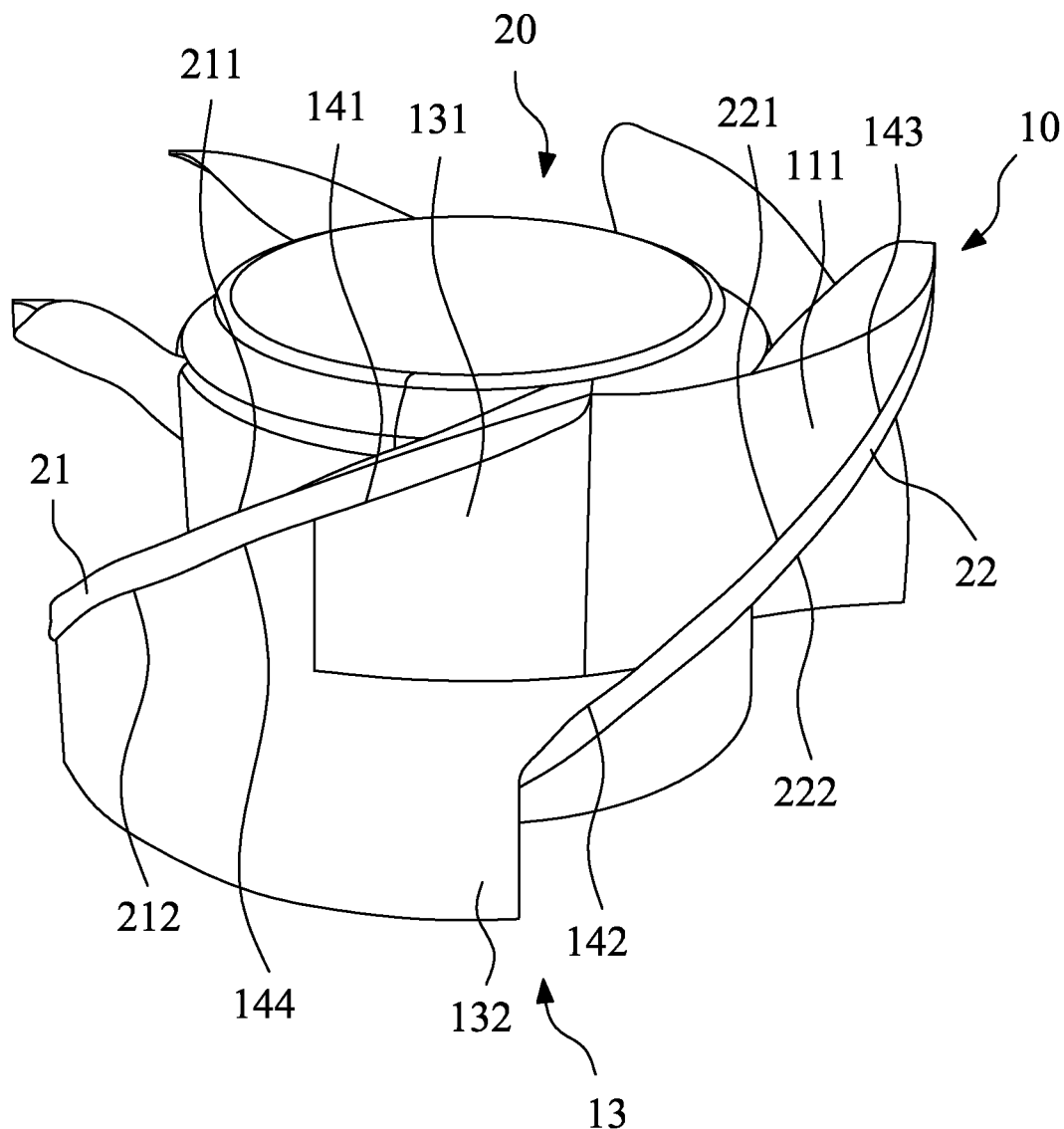
FIG. 1 is a schematic perspective view of an impeller and a portion of a mold according to an embodiment of the present disclosure.
Figure 2:
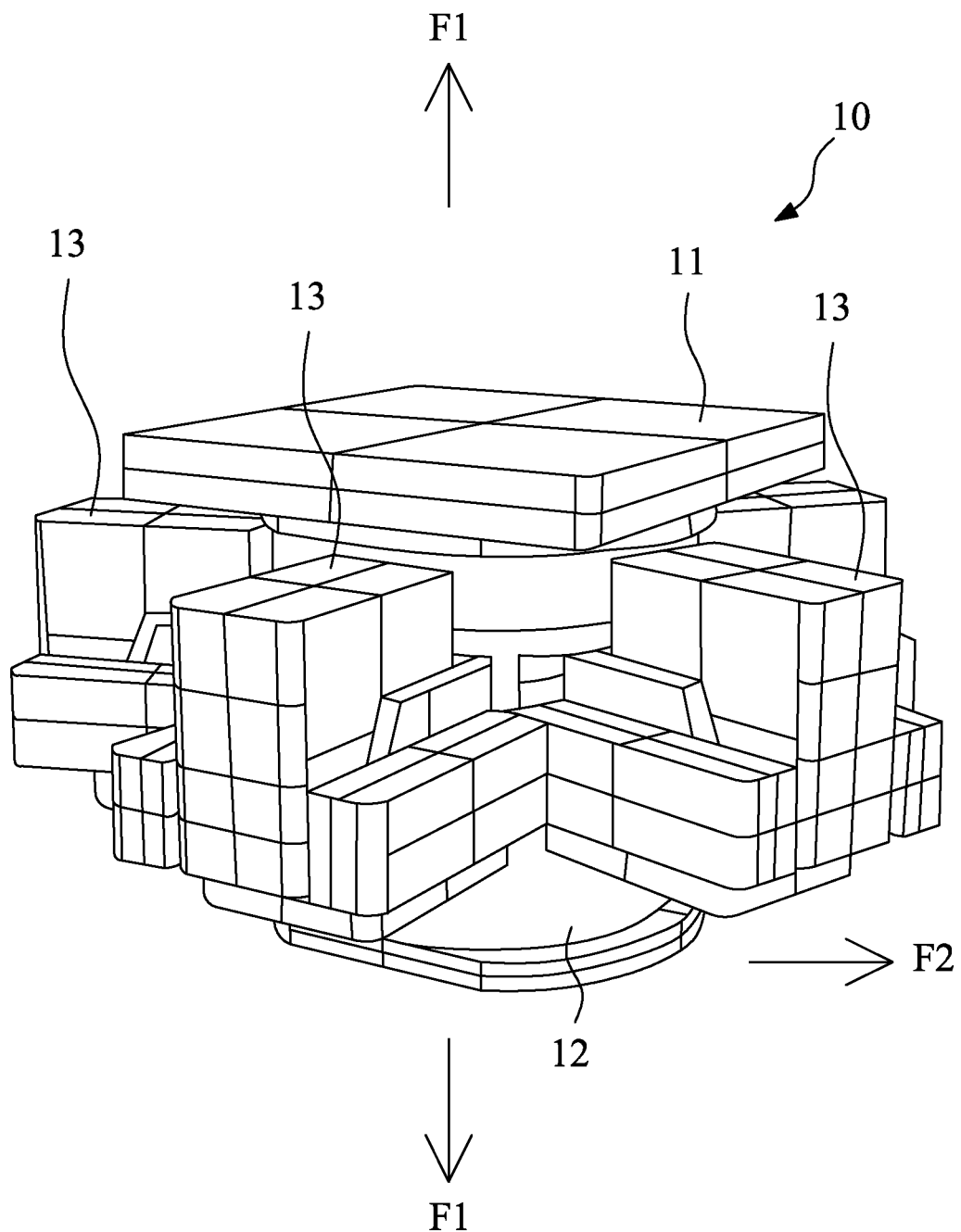
FIG. 2 is a schematic perspective view of a mold for manufacturing an impeller according to the present disclosure.
Figure 3:
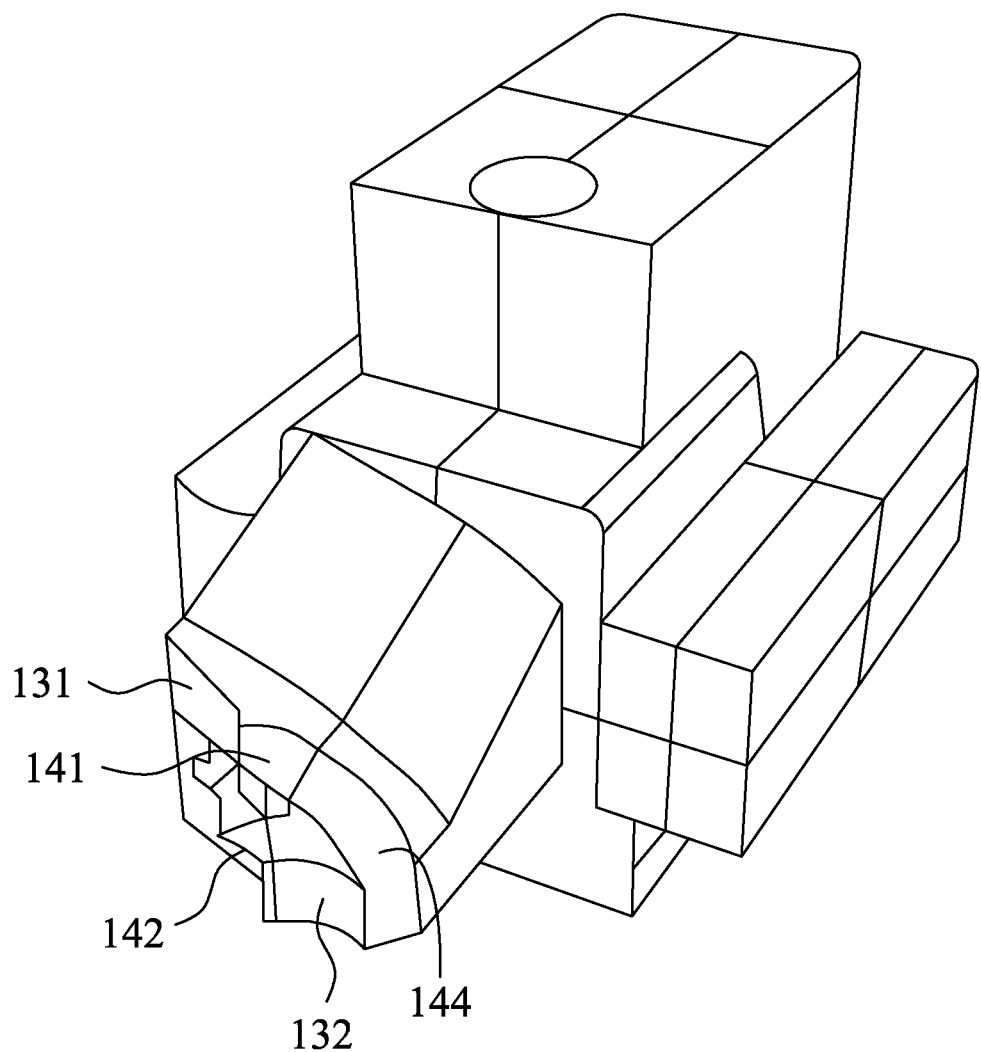
FIG. 3 is a schematic perspective view of a slide group according to the present disclosure.
Figure 4:
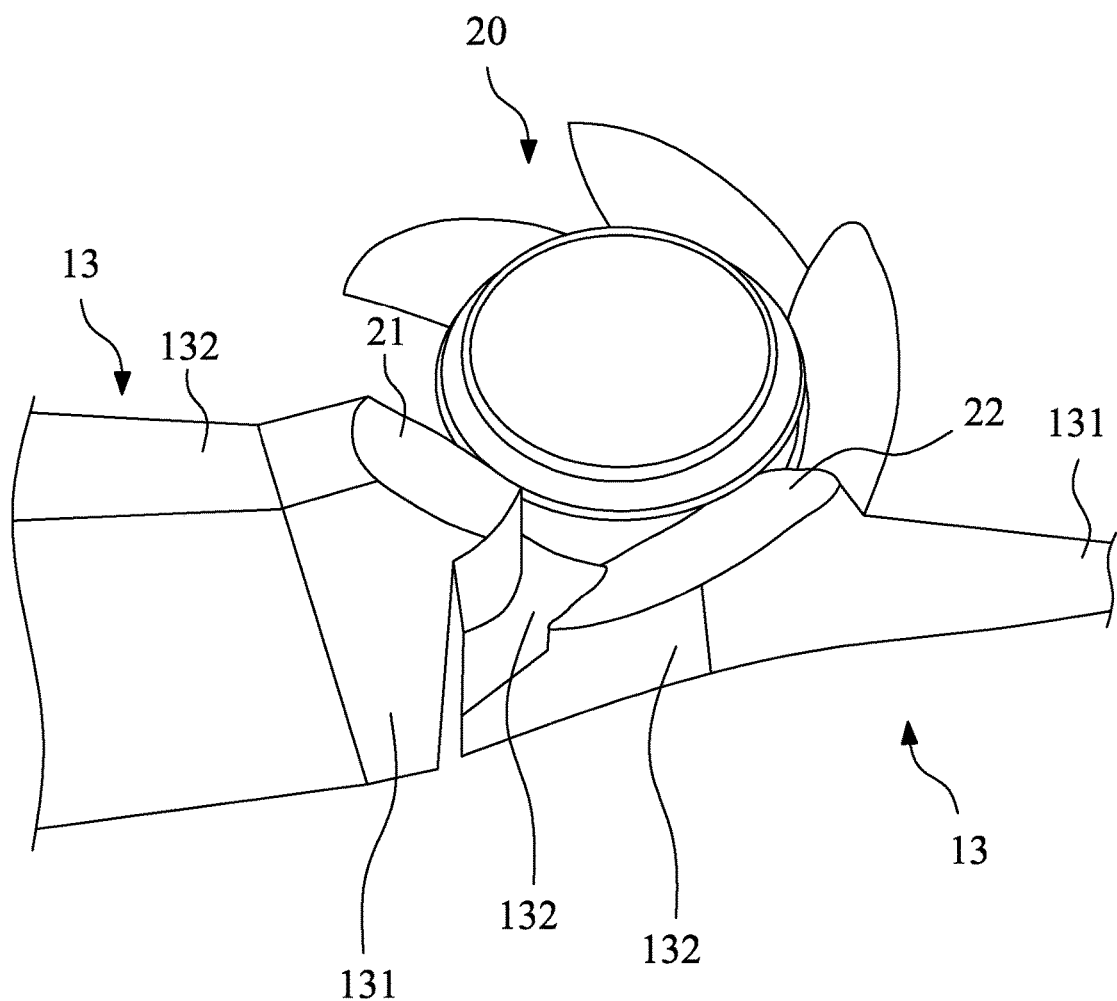
FIG. 4 is a schematic perspective view of an impeller and a slide group according to the present disclosure.
Figure 5:
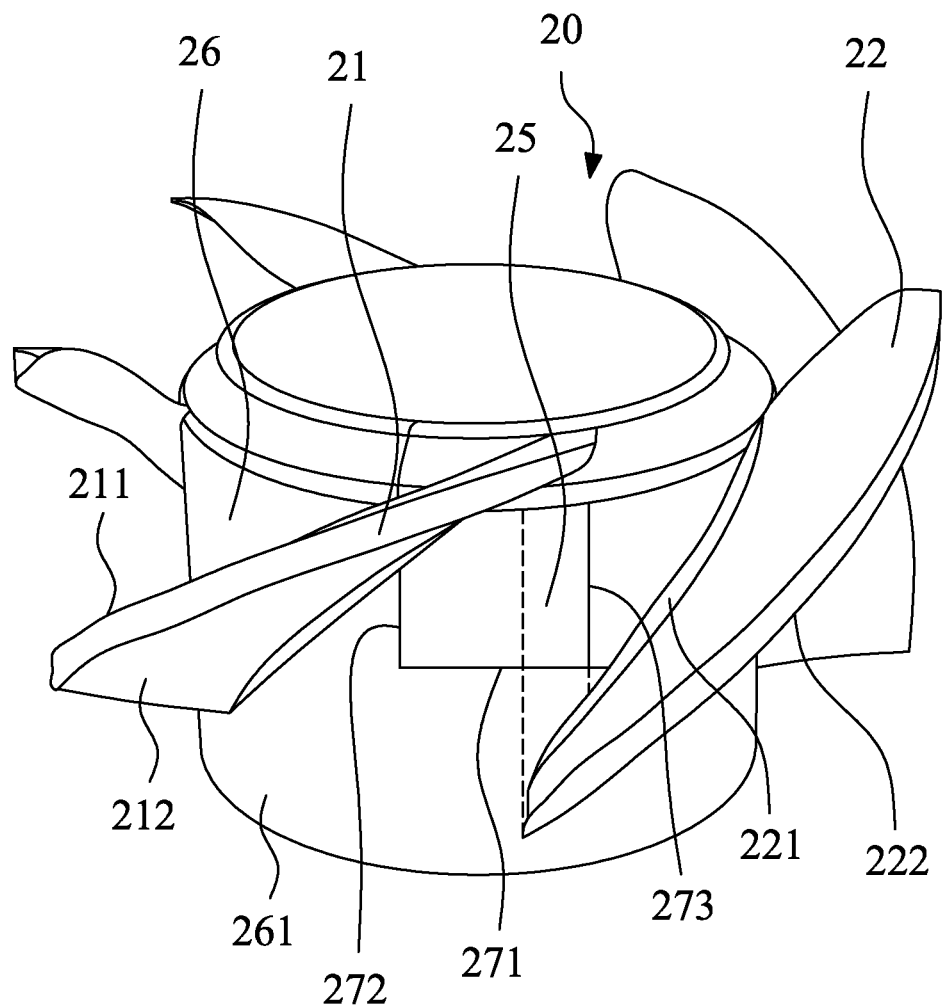
FIG. 5 is a schematic perspective view of an impeller according to an embodiment of the present disclosure.

FIG. 1 is a schematic perspective view of an impeller and a portion of a mold according to an embodiment of the present disclosure. FIG. 2 is a schematic perspective view of a mold for manufacturing an impeller according to the present disclosure. FIG. 3 is a schematic perspective view of a slide group according to the present disclosure. FIG. 4 is a schematic perspective view of an impeller and a slide group according to the present disclosure. FIG. 5 is a schematic perspective view of an impeller according to an embodiment of the present disclosure. Referring to FIG. 1 to FIG. 5, when an impeller 20 is manufactured, a mold 10 closes to form an injection molding space to manufacture the impeller. To show a relative relationship between the mold 10 and the impeller 20, FIG. 1 only shows a portion of the mold, that is, a portion of the mold is cut off along the periphery of the impeller 20, and only the portion of the mold between two blades is shown. In an embodiment, the mold 10 is used for manufacturing the impeller 20. The impeller 20 includes a plurality of blades 21 and 22, and there is an overlapped area 25 between two adjacent blades 21 and 22, as shown by the dotted line in FIG. 5. The overlapped area 25 is parallel to an axial direction of the impeller 20.

The mold 10 includes a first part 11, a second part 12, and a plurality of slide groups 13. The second part 12 is corresponding to the first part 11, and the first part 11 and the second part 12 move in a mold opening direction F1, that is, the mold opening direction F 1 is a longitudinal direction of moving upward and downward. The first part 11 may be a female die, and the second part 12 is a male die. Alternatively, the first part 11 may be a male die, and the second part 12 is a female die.

At least a portion of each slide group 13 is located in the overlapped area 25. Each slide group 13 has a first slide block 131 and a second slide block 132, and a movement direction F2 of the first slide block 131 and the second slide block 132 is perpendicular to the mold opening direction F1, that is, the movement direction F2 is a horizontal direction of moving back and forth. A portion of the first slide block 131 is located in the overlapped area 25, and a portion of the second slide block 132 is located in the overlapped area 25.

Each blade includes an upper surface and a lower surface. Taking the blades 21 and 22 as an example, the blade 21 includes an upper surface 211 and a lower surface 212; and the blade 22 includes an upper surface 221 and a lower surface 222. The first slide block 131 has a first shaping surface 141 to shape a portion of the lower surface 212 of the blade 21, and the second slide block 132 has a second shaping surface 142 to shape a portion of the upper surface 221 of the blade 22 adjacent to the blade 21.

The first part 11 includes a downward extension block 111. The downward extension block 111 has a third shaping surface 143 to shape a portion of the upper surface 221 of the adjacent blade 22. The downward extension block 111 adjacently contacts the first slide block 131, and adjacently contacts a portion of the second slide block 132.

The second slide block 132 further has a fourth shaping surface 144 to shape a portion of the lower surface 212 of the blade 21. Therefore, the first shaping surface 141 of the first slide block 131 and the fourth shaping surface 144 of the second slide block 132 are combined to shape the lower surface 212 of the blade 21. In addition, the second shaping surface 142 of the second slide block 132 and the third shaping surface 143 of the downward extension block 111 are combined to shape the upper surface 221 of the adjacent blade 22.

Therefore, even if there is an overlapped area between two blades of an impeller, by using that the movement direction of the slide group is perpendicular to the mold opening direction, the impeller with blades that have the overlapped area may be successfully manufactured. The blades of the impeller may have a special shape; for example, a curved surface of the blade folds reversely or the blades have different curved surfaces and different curvatures; all these impellers may be manufactured by using the mold of the present disclosure. These impellers having blades with an overlapped area or blades of special shapes may be manufactured by using the mold of the present disclosure.

Referring to FIG. 5, the impeller 20 further includes a hub 26. The blades 21 and 22 are formed at the circumference of the hub 26, the hub 26 has a surface 261, the surface 261 has at least one parting line. At least a portion of the at least one parting line is located in the overlapped area 25. In an embodiment, the surface 261 has a plurality of first parting lines 271, which is horizontally and partially located in the overlapped area 25. The first parting line 271 is caused by a horizontal joint position of the first slide block 131 and the second slide block 132 in FIG. 1.

The surface 261 further has a plurality of second parting lines 272, which is longitudinally formed under the lower surface 212 of the blade 21. The second parting line 272 is caused by a longitudinal joint position of the first slide block 131 and the second slide block 132 in FIG. 1.

The surface 261 further has a plurality of third parting lines 273, which is longitudinally formed above the upper surface 221 of the adjacent blade 22. The third parting line 273 is caused by a longitudinal joint position of the first slide block 131 and the downward extension block 111 in FIG. 1. The third parting line 273 is partially overlapped with the dotted line on the right of the overlapped area 25, and is also located in the overlapped area 25. FIG. 5 only shows the first parting line 271, the second parting line 272, and the third parting line 273 of the overlapped area 25 between the two blades 21 and 22. The impeller 20 has a plurality of blades, which relatively has a plurality of overlapped areas, and therefore the surface 261 of the hub 26 has the plurality of first parting lines 271, the plurality of second parting lines 272, and the plurality of third parting lines 273.

The blades 21 and 22 of the impeller 20 may have a special shape; for example, a curved surface of the blade folds reversely or the blades have different curved surfaces and different curvatures. The impeller of the present disclosure may be manufactured by using the foregoing mold.

Figure 6:
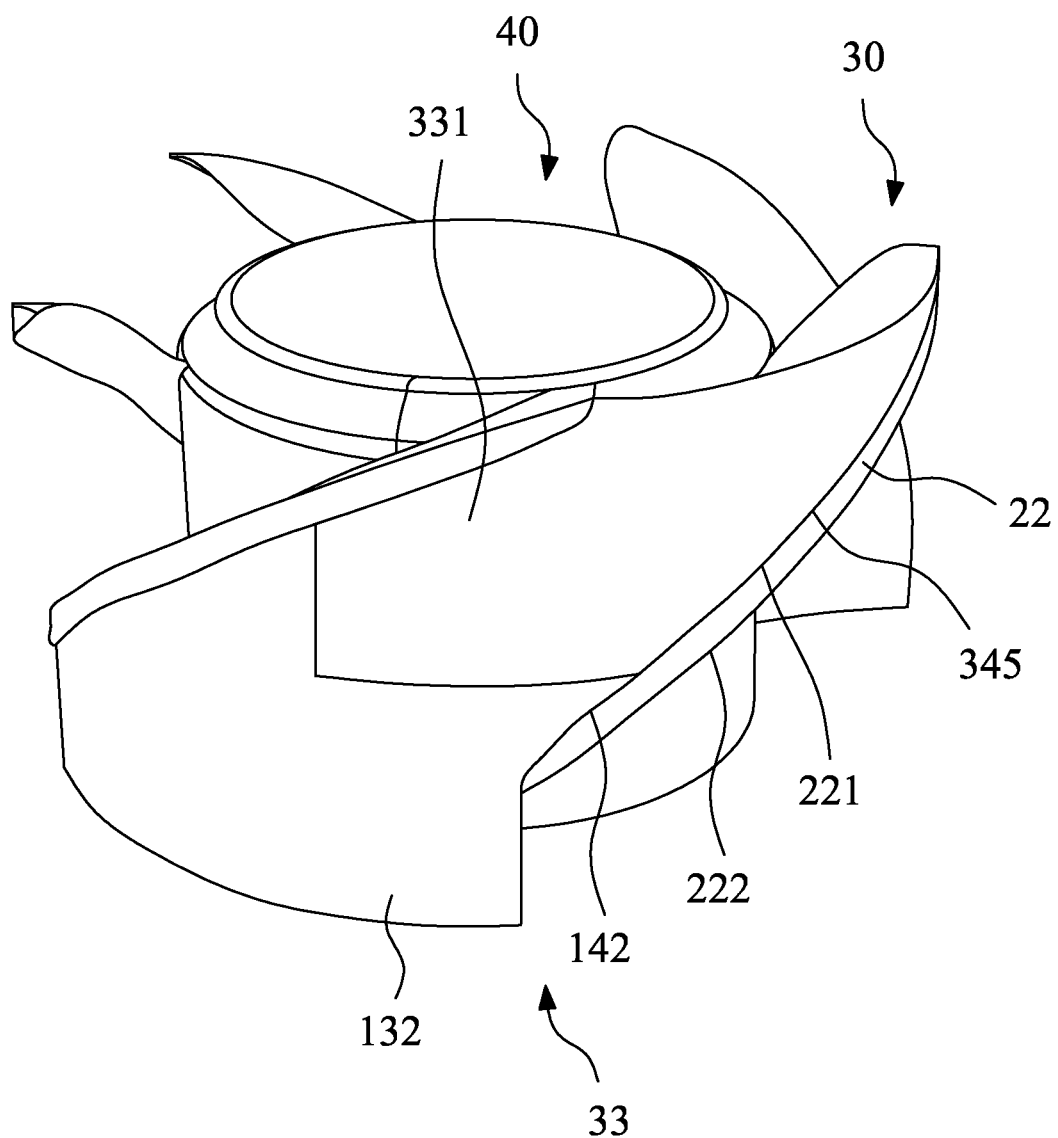
FIG. 6 is a schematic perspective view of an impeller and a portion of a mold according to an embodiment of the present disclosure.
Figure 7:
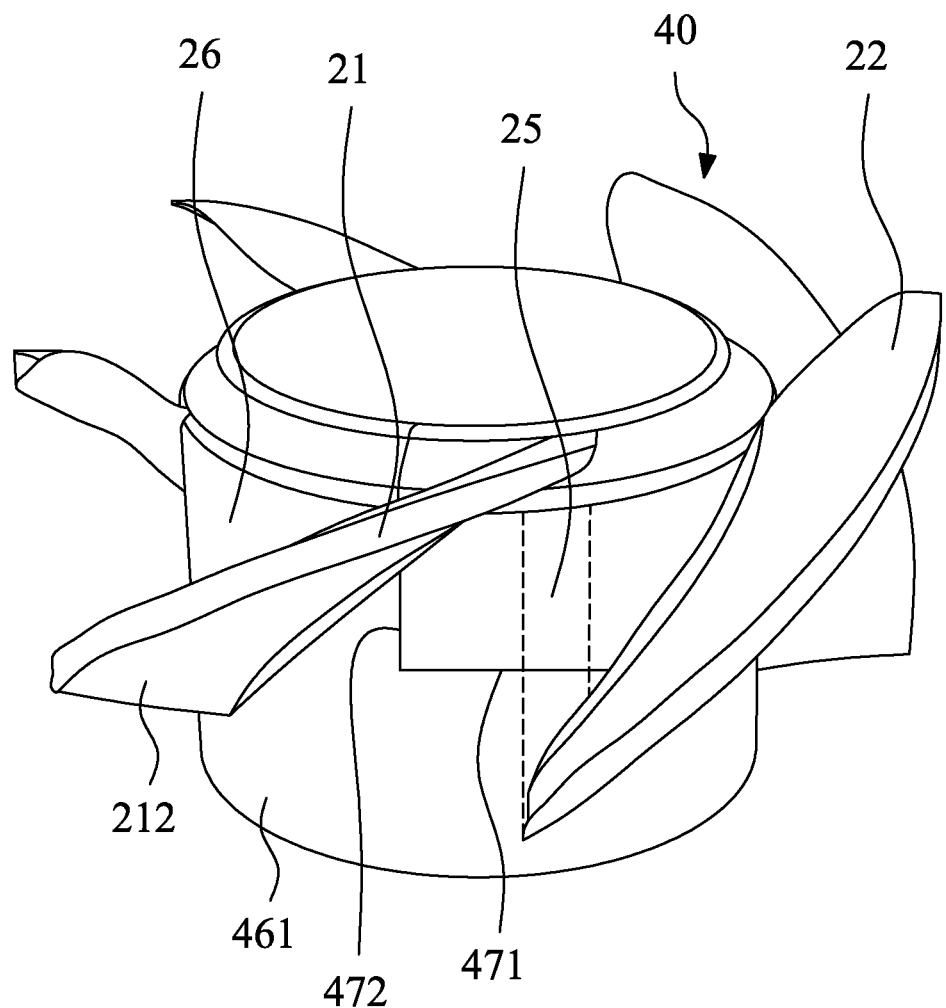
FIG. 7 is a schematic perspective view of an impeller according to an embodiment of the present disclosure.

FIG. 6 is a schematic perspective view of an impeller and a portion of a mold according to an embodiment of the present disclosure. FIG. 7 is a schematic perspective view of an impeller according to an embodiment of the present disclosure. Referring to FIG. 6 and FIG. 7, a mold 30 is used for manufacturing an impeller 40. A difference from the embodiment in FIG. 1 lies in that, a first slide block 331 of the slide group 33 of the mold 30 in this embodiment further has a fifth shaping surface 345 to shape a portion of the upper surface 221 of the adjacent blade 22. That is, the first slide block 331 in FIG. 6 includes the first slide block 131 and the downward extension block 111 in FIG. 1. The second shaping surface 142 of the second slide block 132 and the third shaping surface 345 of the first slide block 331 in FIG. 6 are combined to shape the upper surface 221 of the adjacent blade 22.

In an embodiment, a surface 461 of the impeller 40 has a plurality of first parting lines 471, which is horizontally and partially located in the overlapped area 25. The first parting line 471 is caused by a horizontal joint position of the first slide block 331 and the second slide block 132 in FIG. 6.

The surface 461 further has a plurality of second parting lines 472, which is longitudinally formed under the lower surface 212 of the blade 21. The second parting line 472 is caused by a longitudinal joint position of the first slide block 331 and the second slide block 132 in FIG. 6.

Figure 8:
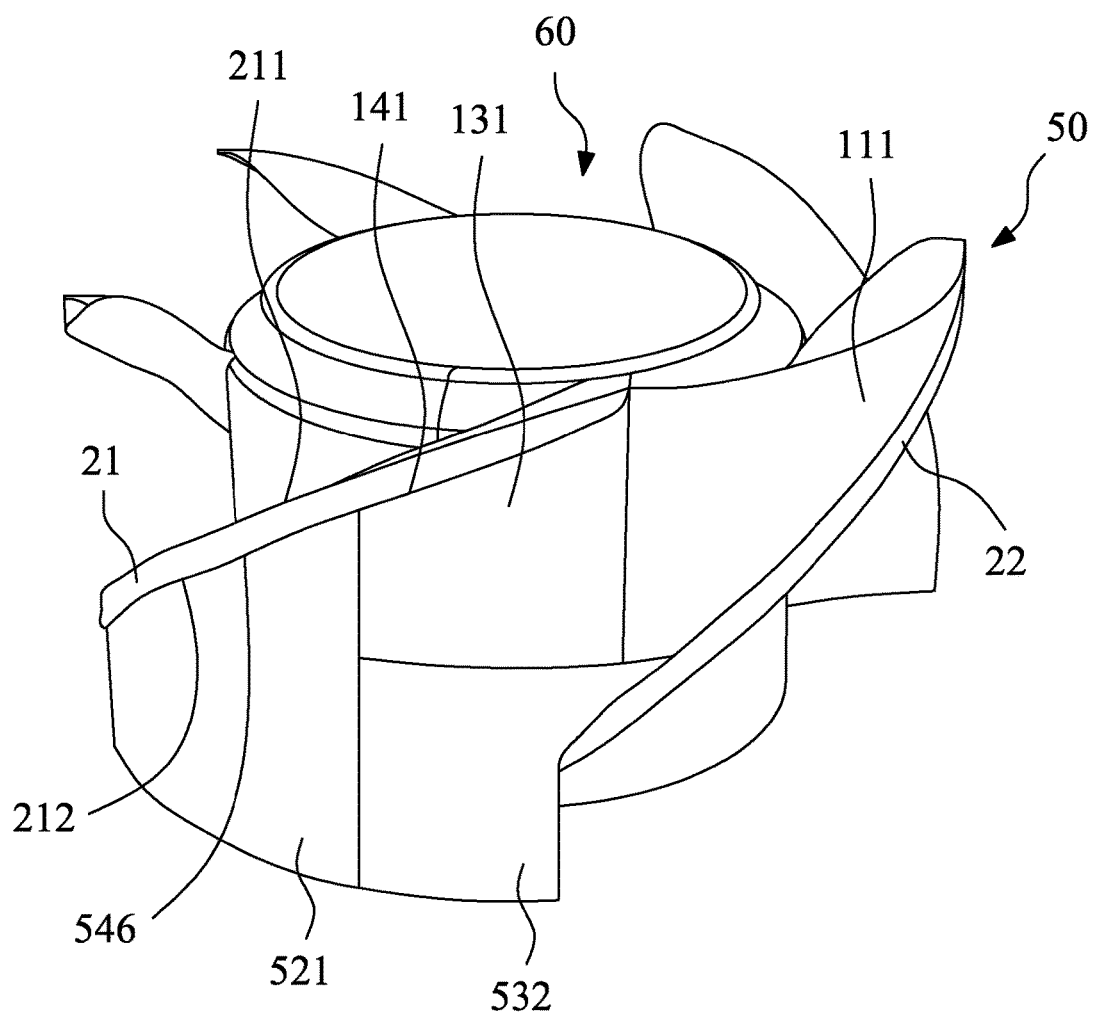
FIG. 8 is a schematic perspective view of an impeller and a portion of a mold according to an embodiment of the present disclosure.
Figure 9:
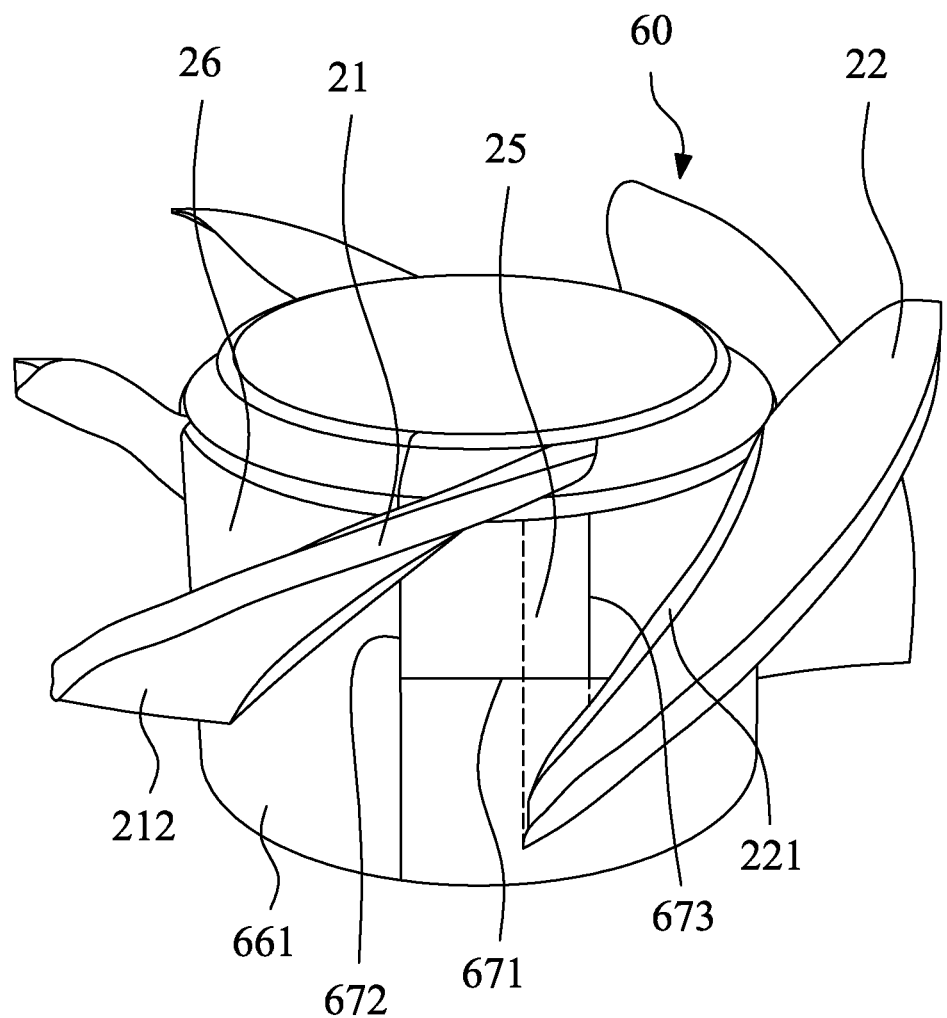
FIG. 9 is a schematic perspective view of an impeller according to an embodiment of the present disclosure.

FIG. 8 is a schematic perspective view of an impeller and a portion of a mold according to an embodiment of the present disclosure. FIG. 9 is a schematic perspective view of an impeller according to an embodiment of the present disclosure. Referring to FIG. 8 and FIG. 9, a mold 50 is used for manufacturing an impeller 60. A difference from the embodiment in FIG. 1 lies in that, a second part (12, referring to FIG. 2) of the mold 50 in this embodiment includes an upward extension block 521. The upward extension block 521 has a sixth shaping surface 546 to shape a portion of the lower surface 212 of the blade 21. That is, the first slide block 132 in FIG. 1 is cut into the upward extension block 521 and a second slide block 532 in FIG. 8. A movement direction of the upward extension block 521 is the same as a movement direction of the second part. The first shaping surface 141 of the first slide block 131 and the sixth shaping surface 546 of the upward extension block 521 are combined to shape the lower surface 212 of the blade 21.

In an embodiment, a surface 661 of the impeller 60 has a plurality of first parting lines 671, which is horizontally and partially located in the overlapped area 25. The first parting line 671 is caused by a horizontal joint position of the first slide block 131 and the second slide block 532 in FIG. 8.

The surface 661 further has a plurality of second parting lines 672, which is longitudinally formed under the lower surface 212 of the blade 21, and extends to the bottom of the hub 26. The second parting line 672 is caused by a longitudinal joint position of the first slide block 131 and the upward extension block 521 and a longitudinal joint position of the upward extension block 521 and the second slide block 532 in FIG. 8.

The surface 661 further has a plurality of third parting lines 673, which is longitudinally formed above the upper surface 221 of the adjacent blade 22. The third parting line 673 is caused by a longitudinal joint position of the first slide block 131 and the downward extension block 111 in FIG. 8. The third parting line 673 is partially overlapped with the dotted line on the right of the overlapped area 25, and is also located in the overlapped area 25.

Figure 10:
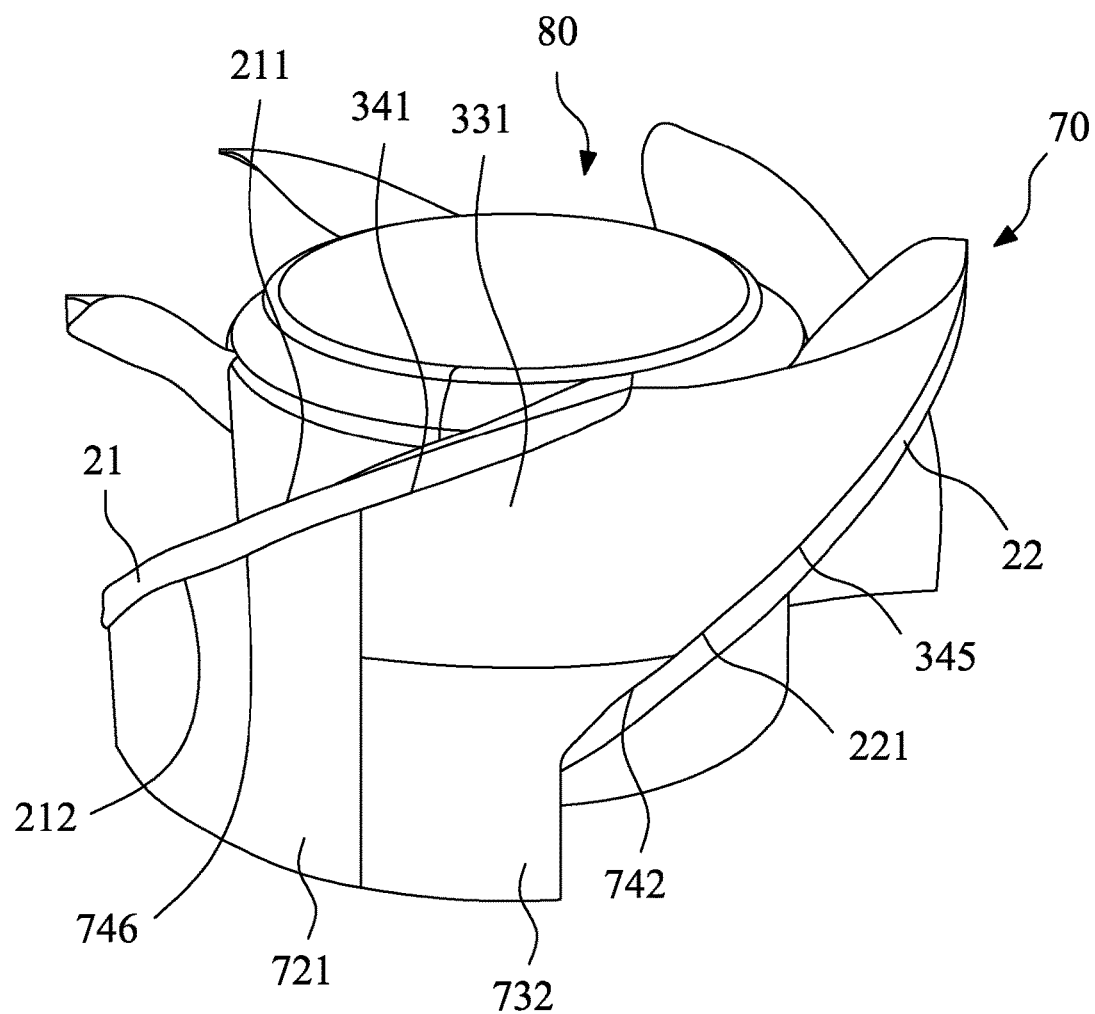
FIG. 10 is a schematic perspective view of an impeller and a portion of a mold according to an embodiment of the present disclosure.
Figure 11:
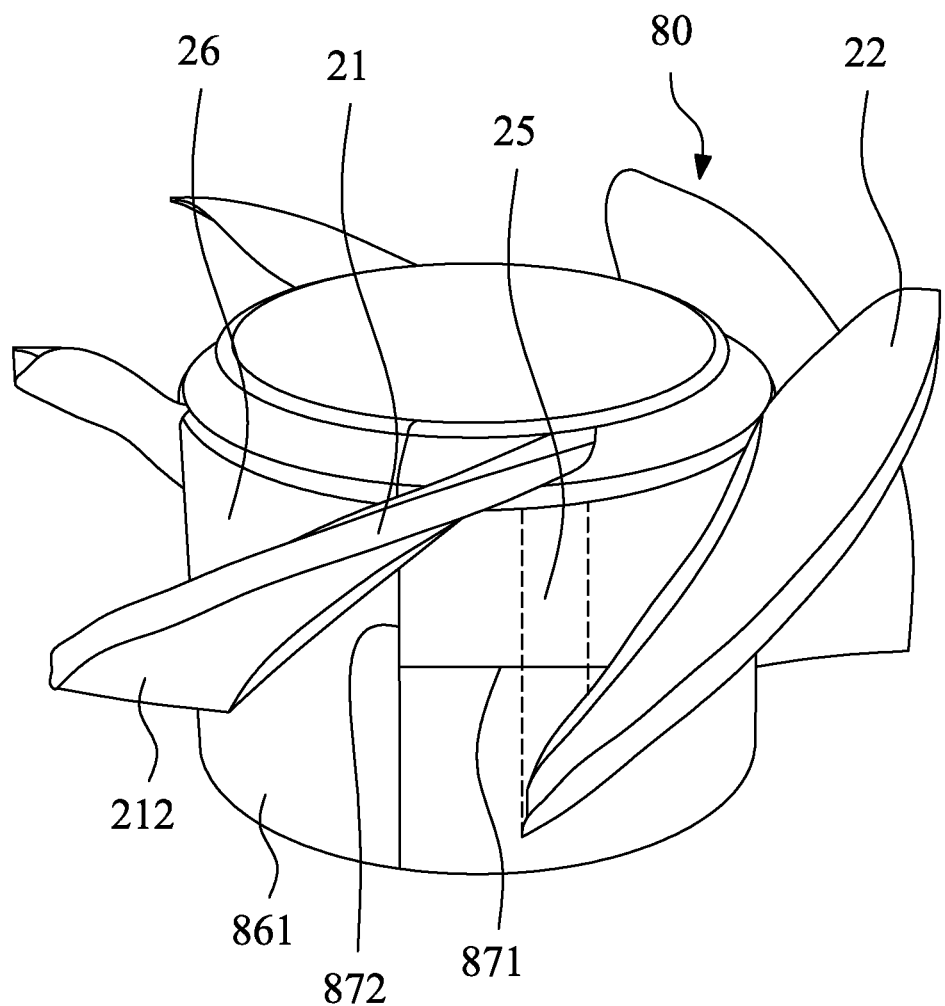
FIG. 11 is a schematic perspective view of an impeller according to an embodiment of the present disclosure.

FIG. 10 is a schematic perspective view of an impeller and a portion of a mold according to an embodiment of the present disclosure. FIG. 11 is a schematic perspective view of an impeller according to an embodiment of the present disclosure. Referring to FIG. 10 and FIG. 11, a mold 70 is used for manufacturing an impeller 80. A difference from the embodiment in FIG. 6 lies in that, a second part (12, referring to FIG. 2) of the mold 70 in this embodiment includes an upward extension block 721. The upward extension block 721 has a sixth shaping surface 746 to shape a portion of the lower surface 212 of the blade 21. That is, the second slide block 132 in FIG. 6 is cut into a second slide block 732 and the upward extension block 721 in FIG. 10. Therefore, the first shaping surface 341 of the first slide block 331 and the sixth shaping surface 746 of the upward extension block 721 are combined to shape the lower surface 212 of the blade 21. In addition, the second shaping surface 742 of the second slide block 732 and the fifth shaping surface 345 of the first slide block 331 are combined to shape the upper surface 221 of the adjacent blade 22.

In an embodiment, a surface 861 of the impeller 80 has a plurality of first parting lines 871, which is horizontally and partially located in the overlapped area 25. The first parting line 871 is caused by a horizontal joint position of the first slide block 331 and the second slide block 732 in FIG. 10.

The surface 861 further has a plurality of second parting lines 872, which is longitudinally formed under the lower surface 212 of the blade 21, and extends to the bottom of the hub 26. The second parting line 872 is caused by a longitudinal joint position of the first slide block 331 and the upward extension block 721 and a longitudinal joint position of the upward extension block 721 and the second slide block 732 in FIG. 10.

While several embodiments of the present disclosure have been illustrated and described, various modifications and improvements can be made by those skilled in the art. The embodiments of the present disclosure are therefore described in an illustrative but not in a restrictive sense. It is intended that the present disclosure should not be limited to the particular forms as illustrated and that all modifications which maintain the spirit and scope of the present disclosure are within the scope defined in the appended claims.

What is claimed is:

1. An impeller, comprising:
   a plurality of blades, wherein there is an overlapped area between two adjacent blades; and
   a hub, wherein the blades are formed at the circumference of the hub, the hub has a surface, the surface has a plurality of first parting lines, at least a portion of the plurality of first parting lines is located in the overlapped area;
   wherein the two adjacent blades comprise an upper surface and a lower surface, wherein the surface of the hub includes a plurality of second parting lines, the plurality of second parting lines are longitudinally formed under the lower surface of the two adjacent blades.

2. The impeller according to claim 1, wherein a portion of each of the plurality of first parting lines is located in the overlapped area.

3. An impeller, comprising:
   a plurality of blades, wherein there is an overlapped area between two adjacent blades; and
   a hub, wherein the blades are formed at the circumference of the hub, the hub has a surface, the surface has a plurality of first parting lines, at least a portion of the plurality of first parting lines is located in the overlapped area;
   wherein the two adjacent blades comprise an upper surface and a lower surface, wherein the surface of the hub includes a plurality of third parting lines, the plurality of third parting lines are longitudinally formed above the upper surface of the two adjacent blades.

4. The impeller according to claim 3, wherein a portion of each of the plurality of first parting lines is located in the overlapped area.

\* \* \* \* \*